UNITED STATES PATENT OFFICE.

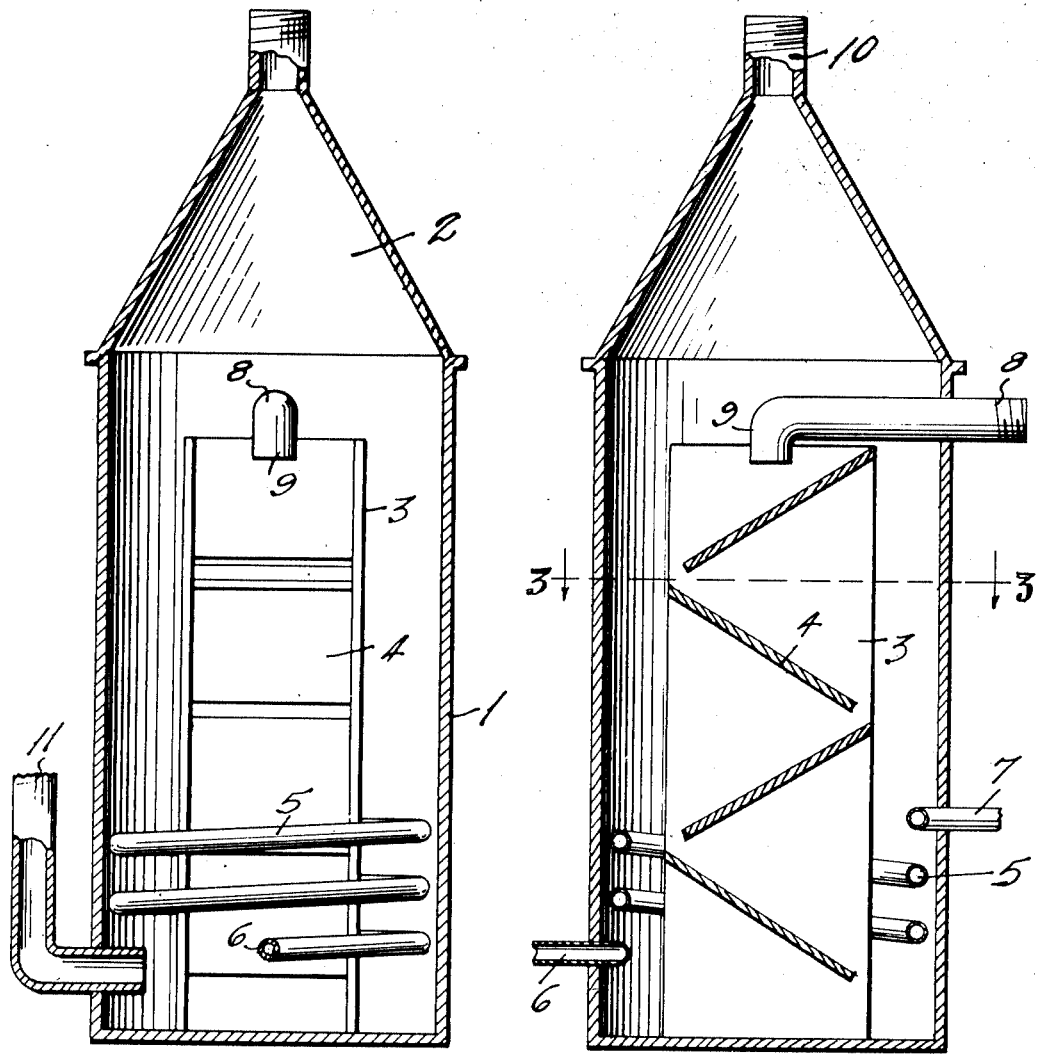
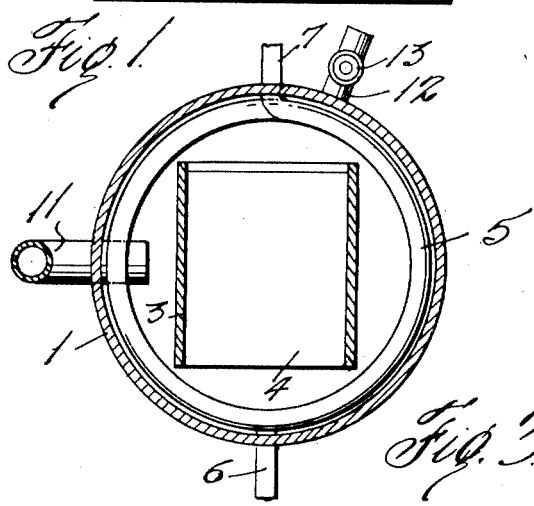

WILLIAM P. LAWRENCE, OF QUINLAN, TEXAS, ASSIGNOR OF ONE-FOURTH TO S. E. DUNNAM, ONE-FOURTH TO L. T. BARNETT, AND ONE-FOURTH TO G. N. COOKE, ALL OF HUNT COUNTY, TEXAS.

CRUDE-OIL SEPARATOR.

1,315,632.   Specification of Letters Patent.   Patented Sept. 9, 1919.

Application filed May 19, 1919. Serial No. 298,038.

*To all whom it may concern:*

Be it known that I, WILLIAM P. LAWRENCE, a citizen of the United States, residing at Quinlan, in the county of Hunt and State of Texas, have invented certain new and useful Improvements in Crude-Oil Separators, of which the following is a specification.

This invention relates particularly to improvements in crude oil separators of the baffle plate type.

The purpose of the invention is to provide a simple, efficient and rapid means of separation whereby the amount of gas vapor is increased and taken off at a less cost. Another result sought is to utilize the heated oil after the separation to heat the crude oil passing to the furnace before separation, thereby saving fuel and expediting the separation.

In carrying out the invention a baffle stand is mounted in an inclosure in which a heating coil is also mounted. A crude oil supply pipe leads to the coil and a pipe leads from the coil to a heating furnace. The heated oil from the furnace flows back to the top of the stand and spreads over the plates as it flows down the same. An outlet is provided for carrying the gas vapor. An overflow is provided at a level above the coil so that the latter is submerged in the heated oil falling from the baffle stand and this oil heats the coil.

The invention will be more readily understood from a reading of the following specification and by reference to the accompanying drawings, in which an example of the invention is shown and wherein:

Figure 1 is a vertical sectional view of a separator constructed in accordance with the invention.

Fig. 2 is a similar view at right angles thereto, and

Fig. 3 is a horizontal cross section on the line 3—3 of Fig. 2.

In the drawings the numeral 1 designates a cylindrical tank having a conical top 2. A baffle stand comprising vertical side plates 3 is mounted in the center of the tank and terminates below the top 2. Between the plates inclined baffles 4 are arranged in superposed order at divergent angles to each other. The baffles are disposed so that the upper end of one extends beyond the lower end of the next adjacent baffle; thus the oil flowing down one baffle falls off onto the next lower one.

A heating coil 5 surrounds the lower portion of the stand within the tank. A crude oil pipe 6 leads into the coil and a discharge pipe 7 leads from the coil through the wall of the tank and extends to a furnace (not shown) for heating the oil. The oil from the furnace is returned by a larger pipe 8 entering the tank above the stand. This pipe 8 terminates in a down-turned elbow 9 over the uppermost baffle 4.

The hot oil flows down the upper baffle and falls onto the next baffle thereunder from which it flows to the lower baffles. The oil spreads as it flows over the baffles whereby a gas vapor is liberated to a maximum extent owing to the spreading action. An outlet 10 is provided at the apex of the conical top and the vapor is discharged through the same from which it is conveyed to a suitable distilling apparatus (not shown).

An overflow elbow 11 has its lower end entering the tank near the bottom of the latter. The upper or discharge end of the elbow is above the discharge of the coil or high enough to keep the coil either submerged or partially submerged in the heated oil flowing from the baffles. This heated oil will heat the coil and thus oil flowing through the coil to the furnace is preheated. The advantage of this is obvious. When the separation is started the oil comes to the furnace cold and must be heated to about 400 degrees Fahrenheit, but after the hot oil has accumulated in the bottom of the tank the coil heats the crude oil passing therethrough to 200 degrees Fahrenheit, and the furnace merely has to raise it to the required degree.

The oil from the overflow may be conveyed to a storage tank (not shown). A drain pipe 12 controlled by the valve 13 leads from the lower end of the tank immediately over the bottom for cleaning out the tank.

What I claim, is:

1. In a crude oil separator, a baffle stand, an inclosure surrounding the baffle stand and having a vapor outlet above the stand, a hot oil supply discharging onto the baffle stand, a crude oil heating coil in the inclosure at the lower portion of the stand, and an overflow for the heated oil accumulating at the coil having a discharge at an elevation to maintain the heated oil above the bottom of the coil.

2. In a crude oil separator, a baffle stand, having diverging baffles, a tank in which the stand is mounted, an outlet at the top of the tank, a hot oil supply discharging onto the baffles of the stand; a crude oil heating coil at the bottom of the stand within the tank and having a source of supply, a discharge leading from the coil through the wall of the tank, and an overflow maintaining the heated oil at the bottom of the tank at a predetermined level and above the bottom of the coil.

3. In a crude oil separator, a tank having a vapor outlet at its top, a baffle stand in the tank, divergent baffles forming part of the stand, a hot oil discharge pipe over the baffle stand, a crude oil heating coil surrounding the lower end of the stand within the tank and having a supply and a discharge leading through the wall of the tank, and an overflow at the lower end of the tank.

4. In a crude oil separator, a cylindrical tank, a conical top on the tank having an outlet at its apex, a baffle stand in the center of the tank composed of vertical side plates with inclined baffles therebetween disposed at divergent angles to each other, a hot oil pipe entering the tank and discharging onto the uppermost baffle, a crude oil heating coil surrounding the lower end of the stand within the tank, and an overflow discharging at an elevation above the coil.

5. In a crude oil separator, a cylindical tank, a conical top on the tank having an outlet at its apex, a baffle stand in the center of the tank composed of vertical side plates with inclined baffles therebetween disposed at divergent angles to each other, a hot oil pipe entering the tank and discharging onto the uppermost baffle, a crude oil heating coil surrounding the lower end of the stand within the tank, and a drain pipe leading from the lower end of the tank.

In testimony whereof I affix my signature.

WILLIAM P. LAWRENCE.